W. CLEMSON.
Apparatus for Tempering Saws.
No. 150,289. Patented April 28, 1874.
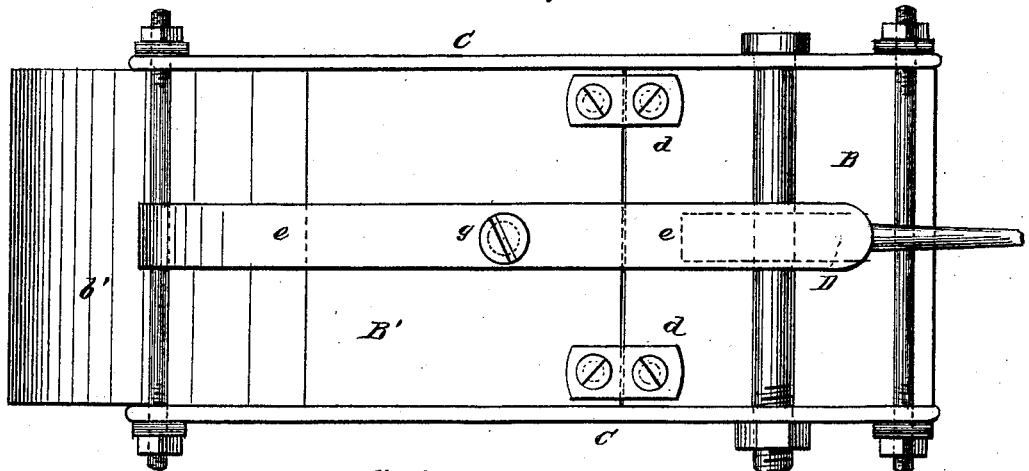
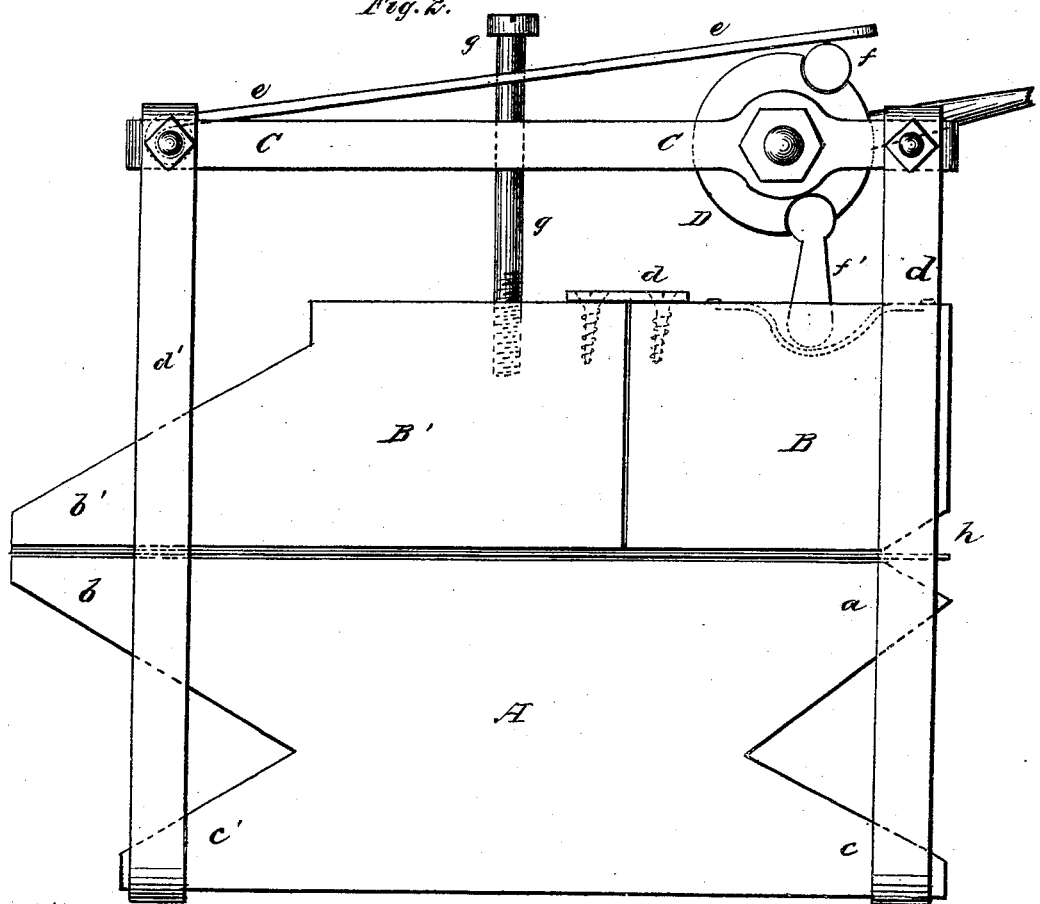

UNITED STATES PATENT OFFICE.

WILLIAM CLEMSON, OF MIDDLETOWN, NEW YORK.

IMPROVEMENT IN APPARATUS FOR TEMPERING SAWS.

Specification forming part of Letters Patent No. 150,289, dated April 28, 1874; application filed April 15, 1874.

*To all whom it may concern:*

Be it known that I, WILLIAM CLEMSON, of Middletown, in the county of Orange and State of New York, have invented certain new and useful Improvements in Apparatus for Tempering Saws; and I do hereby declare that the following is a full, clear, and exact description thereof, which will enable others skilled in the art to which it pertains to make and use the same, reference being had to the accompanying drawings and to the letters of reference marked thereon, which form a part of this specification.

In the manufacture of saws the hardening and tempering is the most important process. The heated saw is plunged into an oil-bath, from which it emerges very brittle and very crooked from the sudden cooling. In order to let down the temper to the desired degree of elasticity and hardness it is common practice to subject the saw to pressure between heated metal plates, so that a suitable temper and some degree of straightening are attained simultaneously. The pressure and heat, as usually applied to the whole, or a large portion, of the saw, at once cause a large percentage to break through the sudden or violent expansion, while the straightening or flattening is imperfect from the same cause.

My invention consists in an improved form and arrangement of tempering-plates, whereby the heat is imparted gradually and increasingly to the saw until the desired degree is attained, and then a part of the heat is reabsorbed by the plates from the saw, for a purpose that will be more fully explained. The flattening can also be done, as it can only be perfectly done, at a temperature neither too high nor too low.

The application of heat of about 400° Fahrenheit will alter the grain or internal structure of the hardened saw. It will have undergone a complete rearrangement in passing from its extreme hardness, and all the flattening that can be done must be done during this transformation or reconstruction of the molecules of the steel.

In order to enable others skilled in the art to which my invention appertains to make and use the same, I will now proceed to describe its construction and operation, referring to the annexed drawing, in which—

Figure 1 is a plan view of my machine. Fig. 2 is a longitudinal vertical section of the same.

Similar letters of reference indicate corresponding parts in the two figures.

The figures here shown are an improvement on saw-tempering apparatus for which patents were granted to me October 31, 1854, and August 21, 1860. The apparatus I now use, as then, consists of cast-iron plates, placed horizontally one above the other, above a fire-place of suitable construction, to heat them to a proper degree. The tempering and flattening of the saw are both effected at one operation, but following each other in time, the flattening being done before the temper is much drawn. By entering the saw at the beveled ends of the plates, and pressing on the lever, then raising it, and moving the saw a short distance at a time until it passes out at the opposite ends, the operation is completed.

The tempering is done by the heat the saws absorb from the plates, and in a perfectly uniform manner.

A is the lower plate, cast with projecting lips $a\ b$, so that their temperature shall be less than the body of the plate. $c\ c$ are lips to project onto the masonry, and, in combination with lips $a\ b$, prevent the plate from warping, as will be more fully shown. B B' are the upper plates, the two together corresponding, except in thickness, to the one below, and are coupled together for convenience of lifting by the yokes $d\ d'$. The plate B is specially devoted to flattening the saw, and the plate B' to giving the desired temper, and to afterward abstracting the heat from the saw at $b'$, in connection with the corresponding surface of the plate A. C is a skeleton-frame of wrought-iron, on which the plates are placed. It serves to keep them in place, and also affords means to operate the toggle-cam, knee-joint, and lever D. Said cam, by lip $f$ passing under the lifting-bar E, moves it upward, and lifts the bolt $g$, and with it the plates B B'. Operating downward, the toggle-bar $f'$ gives the requisite pressure to flatten the saw, each motion alternating in easy succession.

This arrangement is an improvement on my former patents for saw-tempering apparatus. In that of October 31, 1854, I claimed a beveled opening at the entrance to the faces of the plates for the purpose of imparting some degree of heat to the brittle saw-plate, before subjecting it to pressure, to prevent its breaking. But experience has shown that the sudden introduction of the saw to the maximum of heat required to draw the temper is inimical to perfect flattening. For the operation to be quite successful, more time and a less degree of heat are required. Afterward the temper is let down to the proper point.

My present improvement consists in imparting enough of heat, by a modified beveled entrance, $h$, to the saw, to render it somewhat flexible, and then the required amount of heat to secure perfect flattening, and after that the desired temper is gradually and increasingly given. As the saw is moved along between the plates, over the central portion of their length, the maximum of heat and the desired temper are reached. The heat of both the saw and the plates from this point as gradually decreases until the saw passes from between the plates at $b\ b'$. To secure this increasing and decreasing temperature, I form lips, $a\ b$, that stand out from the central and hottest part of the plate A, and which are heated by radiation from the main body of the plate. The object of this arrangement is to be able to flatten the saw at a comparatively low heat, that being the only condition under which it is possible to do so perfectly, for if not completed before a much greater degree of heat is attained the saw when released springs back to its original crookedness or nearly so; but as the saw needs a lower temper to make it possible to set the teeth without breaking them it is passed along over the hottest part of the plates; but if it should be liberated now the saw, by the sudden exposure to cooling at so high heat, would become quite limber through unequal contraction. This I prevent it from doing by having a good part of its heat reabsorbed under pressure, and that gradually, by the projecting lips $b\ b'$. For the more perfect control of the flattening, I make the upper plate in two pieces, B B', so as to concentrate the pressure from the cam D just where it will do most good, the plate B having a depression or suitable construction to receive the lever. After flattening, the mere weight of the plate B' is sufficient to keep the saw in close contact with the lower plate A while the temper is further drawn. Still further along the heat is abstracted sufficiently to insure the saw remaining stiff and firm after its liberation. Furthermore, a great hindrance to the perfect flattening of saws consists in the fact that, however true the faces of the tempering-plates may be planed, the under side over the fire being necessarily hotter than the ends that rest on the masonry makes that side convex, and so causes the planed faces to dish more or less. To obviate this trouble, I make projecting lips, $c\ c'$, to rest on the sides of the fire-box, so that the heat from the fire can readily make them as hot as the body of the plate, but without affecting the required temperature of the lips $a\ b$, and prevent the warping of the planed faces, and so preserve their integrity during the time they are rapidly giving off heat to the saws. I also place the plates in a skeleton-frame, C, that also supports the shaft that goes through the cam, instead of having raised sides cast on the lower plate, as heretofore, for that purpose, for it is found that the sides remain so much cooler than the body of the plate that it tends to warp it. The skeleton-frame also allows of the removal and more convenient planing of the plates.

Having thus fully described my invention, what I claim as new, and desire to secure by Letters Patent, is—

1. The flattening-plate B, having a depression in its upper part, constructed as described, and operating substantially as and for the purposes herein set forth.

2. The combination of the cam and knee-joint D and rod $f'$ with the flattening-plate B, as herein set forth.

3. The combination of cam and knee-joint D, bar $e$, and bolt $g$, for lifting the plates B' B, substantially as herein set forth.

4. The plate A, constructed, as described, with lips $c\ c'$, substantially as and for the purposes herein set forth.

5. The lips $b$ and $b'$, formed upon the plates A and B', respectively, substantially as and for the purposes herein set forth.

6. The combination of the plates B and B', constructed substantially as and for the purposes herein set forth.

7. The combination of the plates A, B, and B', all constructed substantially as and for the purposes herein set forth.

8. The skeleton-frame C, in combination with the plates A, B, and B', substantially as and for the purposes herein set forth.

In testimony that I claim the foregoing as my own, I affix my signature in presence of two witnesses.

WILLIAM CLEMSON.

Witnesses:
ELISHA P. WHEELER,
CHAS. J. HUMPHREY.